United States Patent [19]

Emerson

[11] 4,171,928

[45] Oct. 23, 1979

[54] FOIL BEARING TURBOMACHINE

[75] Inventor: Terence P. Emerson, Hermosa Beach, Calif.

[73] Assignee: The Garrett Corporation, Los Angeles, Calif.

[21] Appl. No.: 834,095

[22] Filed: Sep. 19, 1977

[51] Int. Cl.² ............................................. F01D 3/00
[52] U.S. Cl. .................................... 415/106; 415/104
[58] Field of Search ............... 415/104, 105, 106, 107, 415/205; 308/160

[56] References Cited

U.S. PATENT DOCUMENTS

| | | | |
|---|---|---|---|
| 1,022,425 | 4/1912 | Kuechler | 415/106 |
| 2,658,455 | 11/1953 | Seinfeld | 415/106 |
| 2,659,312 | 11/1953 | Wahle | 415/106 |
| 2,792,197 | 5/1957 | Wood | 415/205 |
| 3,382,014 | 5/1968 | Marley | 308/9 |

Primary Examiner—Louis J. Casaregola
Attorney, Agent, or Firm—Albert J. Miller

[57] ABSTRACT

A foil bearing turbomachine including means to minimize the thrust forces at start up.

18 Claims, 6 Drawing Figures

FOIL BEARING TURBOMACHINE

BACKGROUND OF THE INVENTION

The Government has rights in this invention pursuant to Contract No. NOOO19-75-C-0424 awarded by the Department of the Navy.

Process fluid or gas bearings have now been utilized for some time in an ever increasing number of diverse applications. These fluid bearings, which generally comprise two relatively movable elements with a predetermined spacing therebetween, operate under dynamic conditions to form a supporting wedge of fluid therebetween sufficient to prevent contact between the two relatively movable members.

Improved fluid bearings, particularly bearings of the hydrodynamic type, have been developed by providing foils in the space between the relatively movable bearing elements. These foils, of a generally thin sheet of a compliant material, are deflected by the hydrodynamic film force between adjacent surfaces. The foils thus enhance the hydrodynamic characteristics of the fluid bearings and enable operation under more extreme load conditions than heretofore had been possible with fluid bearings.

The ready availability of relatively clean process fluid or ambient atmosphere as the bearing fluid makes these hydrodynamic, fluid film lubricated bearings particularly attractive for high speed rotating machinery both as journal bearings and as thrust bearings. While in many cases the hydrodynamic or self-acting fluid bearings provide sufficient load bearing capacity solely from the pressure generated by the fluid film wedge formed by the relative rotation of the two converging surfaces, in some cases it is necessary to externally pressurize the fluid introduced between the bearing surfaces so as to further increase the load carrying capacity. These externally pressurized or hydrostatic fluid bearings do however introduce the requirement for an external source of clean fluid under pressure.

Illustrative of hydrodynamic and hydrostatic bearing patents assigned to the same assignee of this application are U.S. Pat. Nos.: 3,215,479, 3,215,480, 3,366,427, 3,375,046, 3,382,014, 3,434,761, 3,434,762, 3,467,451, 3,511,544, 3,560,064, 3,615,121, 3,635,534, 3,642,331, 3,677,612, 3,893,733, 3,951,474, and 3,957,317.

One of the problems inherent in these fluid film bearings, whether hydrostatic or hydrodynamic or whether enhanced with foils between the relatively movable bearings elements, is the initial start up of the bearing. While the introduction of the compliant foils has greatly reduced the inherent problems of start up and low speed operations, conditions still arise which make start up of such bearings difficult. The foils, being resilient, are better able to withstand the effects of frictional contacts but substantial forces can still be imposed upon them which in some cases may have the tendency to tear the foils or even yank them loose from their positioning arrangements.

One means which has been developed to overcome the inherent problems of start up and low speed operation has been the coating of the individual foil elements with a high lubricity material such as a fluorocarbon or stratified fluorocarbon. Such coatings have greatly reduced the start up loads and rubbing contacts for such bearings. Such coatings are generally described in U.S. Pat. No. 3,677,612, assigned to the assignee of this application.

While the use of a high lubricity coating has further alleviated the inherent start up problems of these foil bearings, certain high speed rotating machinery applications still present difficulties particularly for thrust bearings or bearings having a thrust component. Typically, the start up of a foil bearing turbomachine is accomplished by passing high pressure air from an external source through the turbine. This flow of high pressure air will set up thrust forces on the rotating assembly which can significantly increase the frictional contact of the foil bearings. With increased static friction, higher torque is required for start up of the turbomachine which means higher gas pressure which tends to further increase the thrust forces and static friction. Because of this self-magnifying effect, it may be difficult to establish the dynamic fluid film and, in extreme cases, it may be impossible to start the turbomachine. In any case, the increased static friction from the thrust forces will accelerate bearing wear.

SUMMARY OF THE INVENTION

The invention described herein provides for the venting of gas pressure from behind the back plate of a turbine wheel to relieve the thrust forces imposed upon a fluid film foil thrust bearing during start up of the turbomachine.

DESCRIPTION OF THE PREFERRED EMBODIMENTS

Figure 1:
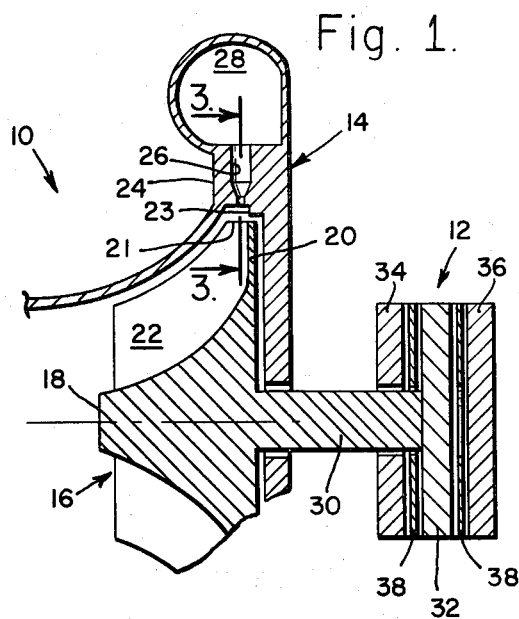
FIG. 1 is a sectional view of the foil bearing turbomachine of the present invention.

As illustrated in FIG. 1, the foil bearing turbomachine of the present invention generally comprises a turbine 10 and a thrust bearing 12. The turbine 10 includes a turbine housing 14 disposed around a turbine wheel 16 having a hub 18 and back plate 20 between which are disposed a plurality of blades 22. The turbine housing 14 disposed around the turbine wheel 16 comprises a nozzle ring 24 having a plurality of individual nozzles 26 to provide a working fluid from a torus 28 to the tips 21 of the turbine blades 22 so as to induce rotation of the turbine wheel 16. A projection 23 from the nozzle ring 24 reduces the clearance between the nozzle ring 24 and the turbine wheel back plate 20 to restrict the flow therebetween.

The thrust bearing 12 is shown connected to the turbine wheel 16 by means of a shaft 30. Specifically, the thrust runner 32 of the bearing 12 is affixed to the shaft 30 and is supported between a pair of thrust plates 34 and 36 by a plurality of individual bearing foils 38. While not shown, the shaft 30 would also be radially supported by conventional rolling contact or fluid film foil bearings.

Figure 2:
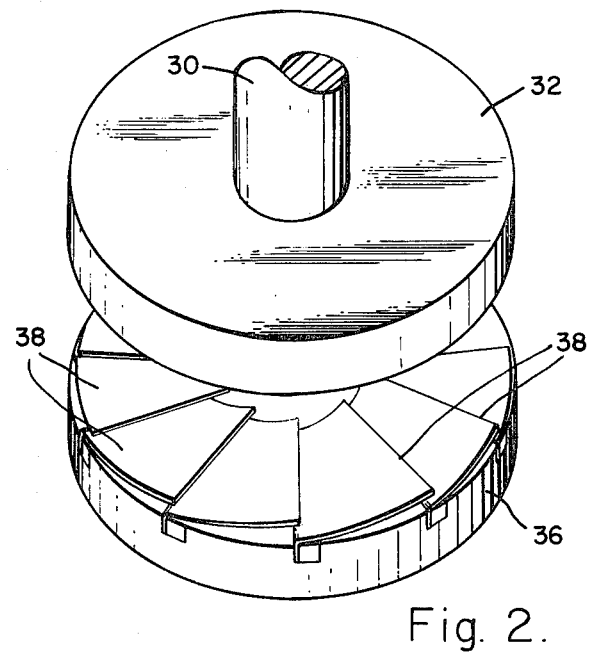
FIG. 2 is an exploded perspective view of a portion of the thrust bearing of the foil bearing turbomachine of FIG. 1.

One side of the thrust bearing 12 is more clearly illustrated in an exploded view in FIG. 2. While the bearing foils 38 have been generally illustrated as being mounted directly on the thrust plate 36 to extend slightly outward therefrom, these foils 38 can be mounted in a number of different fashions and there may be included a number of intermediate elements between the foils 38 and the thrust plate 36. Reference should be made to U.S. Pat. Nos. 3,615,121, 3,635,534, and 3,677,612 for a description of these different methods of mounting the foils 38 to the thrust plate.

During start up of the turbomachine, high pressure air or gas is directed against the turbine wheel 16 through nozzles 26. When first introduced, this high pressure air establishes a pressure between the back of the turbine wheel back plate 20 and the turbine nozzle 14. This pressure, which can easily reach several psig, exerts a thrust force which will tend to displace the turbine wheel 16 and hence the thrust runner 32 to the left. This thrust force and resultant leftward movement will increase the static friction between the left side of the thrust runner 32 and the plurality of foils 38 mounted on the left hand thrust plate 34. The static friction can in some cases be so great as to prevent start up of the turbomachine and even if start up is permitted, the increased static friction will increase and accelerate wear upon the bearing foils 38.

Figure 3:
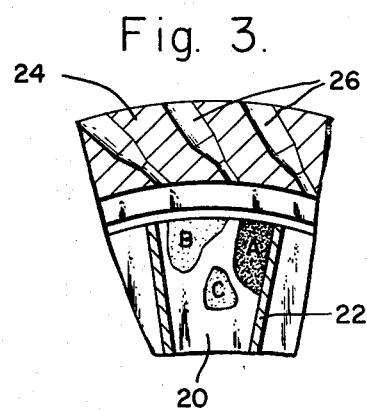
FIG. 3 is a sectional view, taken along line 3—3 of FIG. 1, showing typical pressure profiles on the front side of the turbine wheel back plate.

It has been found that on the turbine blade or front side of back plate 20 of the turbine wheel 16 there are areas of high positive pressure and regions of zero or negative pressure in the vicinity of the blade tip 21. The area of high positive pressure is designated by the letter "A" in FIG. 3, while the regions of negative pressure are designated by letters "B" and "C". Negative pressure region "B" is believed to be a nozzle jet wake region where a jet pumping action is established. Region "C" is probably a low pressure vortex zone. By providing a vent in a negative pressure zone on the front side of the back plate 29, the air pressure established on the opposite or back side of the back plate 20 can be reduced and in some instances can be made to have a zero or negative value. This venting of the back side of the turbine wheel 16 will substantially balance the thrust forces exerted upon the turbine wheel 16 by the high pressure gases used at start up.

Figure 4:
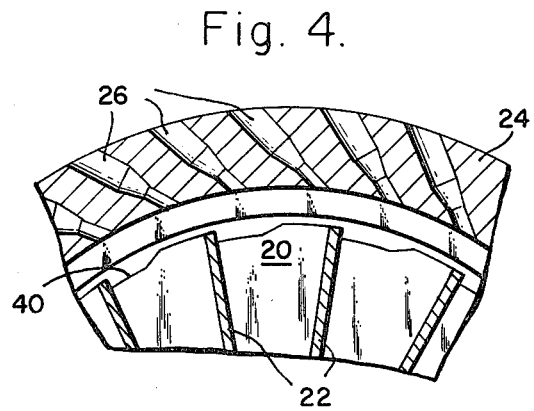
FIG. 4 is a sectional view of one embodiment of the turbine wheel of the foil bearing turbomachine of FIG. 1.
Figure 6:
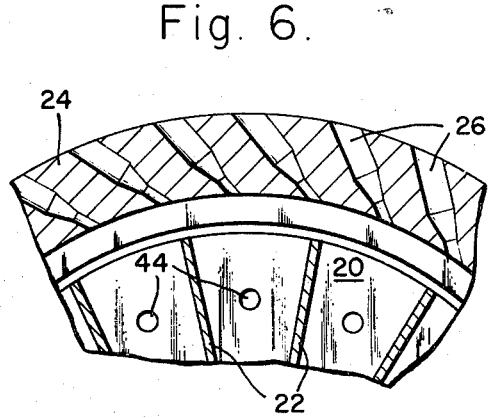
FIG. 6 is a sectional view of yet another alternate embodiment of the turbine wheel of the foil bearing turbomachine of FIG. 1.
Figure 5:
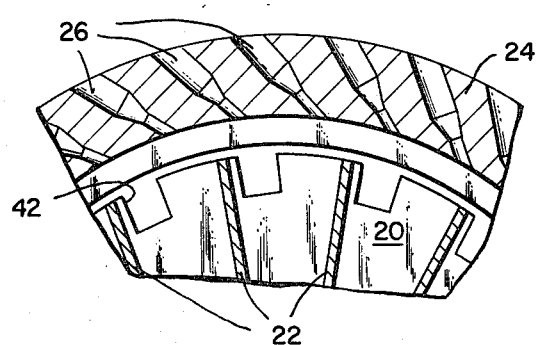
FIG. 5 is a sectional view of an alternate embodiment of the turbine wheel of the foil bearing turbomachine of FIG. 1.

While the negative pressure areas will vary depending upon the turbine wheel configuration, these locations can be readily verified experimentally. FIGS. 4, 5, and 6 illustrate three typical vent locations in areas of negative pressure near the blade tip 21. In FIG. 4 an elongated slot 40, for example, of an approximate depth of 0.050 inches is provided between each blade 22 at the outer edge of the back plate 20. These slots 40, through the entire thickness of the back plate 20, would extend from the suction side of each blade 22 for approximately one-half of the circumferential distance between adjacent blades.

FIG. 5 shows an illustration of a deeper slot 42, for example, 0.190 inches from the outer edge of the back plate 20 but extending from the suction side of each blade 22 for only about one-third of the circumferential distance between adjacent blades. FIG. 6 generally illustrates an oval or circular hole 44 extending through the back plate 20 in an identified negative pressure zone between adjacent blades 22.

Each of these three embodiments will relieve or suck air from behind the back plate 20 to vent air pressure developed there from the high pressure air used during start up of the turbomachine. They will reduce and in many cases eliminate this pressure and thereby minimize thrust forces introduced during start up. While the size, shape and location of these vents will vary depending upon the particular characteristic of the turbomachine, it is required that they extend completely through the back plate 20 and be located in identified areas of negative pressure on the front side of the back plate 20. It is recognized that each of these embodiments will provide some penalty to turbine operation. The shallow slot 40 of FIG. 4 does not, however, appreciably affect turbine performance and for that reason is preferred.

While specific embodiments of the invention have been illustrated and described, it is understood that these are provided by way of example only. While the invention is shown with a thrust bearing, it should be readily apparent that it is equally applicable to a conical bearing which has a thrust component. The invention is to be construed as being limited only by the proper scope of the following claims.

What I claim is:

1. A turbine wheel rotatably supported by bearings within a turbine housing, said wheel comprising:
    a hub;
    a back plate disposed at one end of said hub; and
    a plurality of blades generally extending between said hub and said back plate;
    said back plate, in areas of negative pressure on the blade side thereof, including a plurality of peripheral slots extending through said back plate to relieve pressure from the non-blade side thereof, an individual slot extending from the suction side of each blade along the periphery of said back plate.

2. The turbine wheel of claim 1 wherein each peripheral slot is generally shallow and extends from the suction side of each blade generally to the mid-point between adjacent blades.

3. The turbine wheel of claim 2 wherein each shallow slot is approximately 0.050 inches in depth.

4. The turbine wheel of claim 1 wherein each peripheral slot is generally deep.

5. The turbine wheel of claim 4 wherein each deep slot is approximately 0.190 inches in depth.

6. A turbomachine comprising:
    a turbine housing;
    a rotatable turbine wheel disposed within said turbine housing; and
    bearing means to rotatably support said turbine wheel within said turbine housing, said bearing means including a foil thrust bearing to axially restrain said rotatable turbine wheel;
    said turbine wheel comprising a hub, a back plate disposed at one end of said hub, and a plurality of blades extending between said hub and said back plate, said back plate, in areas of negative pressure on the blade side thereof when a pressurized fluid is directed against the blades of said turbine wheel, including a plurality of peripheral slots extending through said back plate to relieve fluid pressure from the non-blade side thereof.

7. The turbomachine of claim 6 wherein said foil thrust bearing comprises a rotatable thrust runner connected to said turbine wheel, a first thrust plate disposed on one side of said thrust runner, a second thrust plate disposed on the other side of said thrust runner, a first plurality of compliant foils disposed between said first thrust plate and said thrust runner, and a second plurality of compliant foils disposed between said second thrust plate and said thrust runner.

8. The turbine wheel of claim 7 wherein one peripheral slot is included between each two adjacent blades.

9. The turbine wheel of claim 8 wherein each peripheral slot is generally shallow and extends from the suction side of each blade generally halfway toward the pressure side of each adjacent blade.

10. The turbine wheel of claim 9 wherein each shallow slot is approximately 0.050 inches in depth.

11. The turbine wheel of claim 8 wherein each peripheral slot is generally deep and situated at the suction side of each blade.

12. The turbine wheel of claim 11 wherein each deep slot is approximately 0.190 inches in depth.

13. A turbomachine comprising:
a turbine housing;
a rotatable turbine wheel disposed within said turbine housing, said wheel including a hub, a back plate disposed at one end of said hub, and a plurality of blades extending between said hub and said back plate; and
bearing means, including a foil thrust bearing to axially restrain said rotatable turbine wheel, to rotatably support said turbine wheel within said turbine housing, the foil thrust bearing comprising a rotatable thrust runner connected to said turbine wheel, a first thrust plate disposed on one side of said thrust runner, a second thrust plate disposed on the other side of said thrust runner, a first plurality of compliant foils disposed between said first thrust plate and said thrust runner, and a second plurality of compliant foils disposed between said second thrust plate and said thrust runner;
said turbine housing including a nozzle ring disposed around said turbine wheel and including a plurality of nozzles to direct the flow of a pressurized fluid against the turbine wheel, said nozzle ring having an annular projection extending towards the turbine wheel back plate to reduce the clearance and thereby restrict the flow of pressurized fluid therebetween;
said turbine wheel back plate, in areas of negative pressure on the blade side thereof when a pressurized fluid is directed from the turbine ring nozzles against said turbine wheel, including a plurality of peripheral slots extending through said back plate to relieve fluid pressure from the nonblade side thereof.

14. The turbine wheel of claim 13 wherein one peripheral slot is included between each two adjacent blades.

15. The turbine wheel of claim 14 wherein each slot is generally shallow and extends along the periphery thereof of said back plate from the suction side of each blade generally to the mid-point between adjacent blades.

16. The turbine wheel of claim 15 wherein each shallow slot is approximately 0.050 inches in depth.

17. The turbine wheel of claim 14 wherein each peripheral slot is generally deep and situated at the suction side of each blade.

18. The turbine wheel of claim 17 wherein each deep slot is approximately 0.190 inches in depth.

* * * * *